350-357
7/8/86    XR    4,599,614

United States Patent [19]
DeBerry et al.

[11] Patent Number: 4,599,614
[45] Date of Patent: Jul. 8, 1986

[54] PHOTOELECTROCHROMIC DISPLAY

[75] Inventors: David W. DeBerry; Alfred Viehbeck, both of Austin, Tex.

[73] Assignee: SumX Corporation, Austin, Tex.

[21] Appl. No.: 531,940

[22] Filed: Sep. 13, 1983

[51] Int. Cl.$^4$ .............................................. G09G 3/02
[52] U.S. Cl. ................................... 340/785; 340/707; 340/713; 340/714; 350/357
[58] Field of Search ............... 340/785, 707, 783, 713, 340/714, 703; 350/357

[56] References Cited

U.S. PATENT DOCUMENTS

| | | | |
|---|---|---|---|
| 3,986,771 | 10/1976 | Tsukada | 350/357 |
| 4,033,673 | 7/1977 | Seki | 340/785 |
| 4,126,456 | 11/1978 | Pole et al. | 350/357 |
| 4,365,010 | 12/1982 | Bard et al. | 350/357 |

OTHER PUBLICATIONS

"Controllable Persistence In Electrochromic Effect and Its Use In Beam Addressable Displays" *IBM Tech. Disc. Bull.*, vol. 17, No. 10, Mar. 1975, pp. 3151–3153, I. F. Chang.

*Primary Examiner*—Gerald L. Brigance
*Attorney, Agent, or Firm*—Pravel, Gambrell, Hewitt & Kimball

[57] ABSTRACT

A solid electrochromic film is used on a semiconductor electrode in a display device permitting the user to write on the display using a light pen. Additional elements, including arrangement of the semiconductor electrodes transversely with respect to counter-electrodes, or providing an electrochromic film on the counter-electrodes, further enhance the versatility of the display device.

31 Claims, 4 Drawing Figures

PHOTOELECTROCHROMIC DISPLAY

FIELD OF THE INVENTION

This invention pertains to light addressable flat panel display devices. More specifically, the present invention is directed to a light addressable electrochromic display panel.

BACKGROUND OF THE INVENTION

Electrochromic materials are substances which change color under electrical stimulation. Electrochromic material is one color in its reduced state and another color in its oxidized state. Most electrochromic materials change color through a redox reaction that is driven by electric current flowing across an electrolyte —electrochrome interface.

Representative reaction mechanisms for redox electrochromic materials include those for Prussian Blue (ferric ferrocyanide), V. D. Neff, *J. Electrochem. Soc.*, 125, 886 (1978), lutetium diphthalocyanine [Margie M. Nicholson, *Ind. Eng. Chem. Prod. Res. Dev.* 21, 261 (1982)]; viologens [B. Reichman, Fu-Ren F. Fan, and A.J. Bard, *J. Electrochem. Soc.*, 127, 333 (1980)], tungsten oxides [B. Reichman and A.J. Bard, *J. Electrochem. Soc.*, 126, 583 (1979)], and others.

Several authors have mentioned possible display applications for electronically addressable systems involving electrochromic material on a conductive substrate [Margie M. Nicholson, *Ind. Eng. Chem. Prod. Res. Dev.* 21, 261 (1982)]; e.g., electronically addressable electrochromic displays using tungsten oxides have been suggested for timepieces, according to some researchers (Id. at 265). The major problem with fabrication of these displays, however, was the complexity of matrix addressing systems necessary to achieve the flexibility required for a plurality of displays.

The photoelectrochromic effect of semiconductor—metallic ion solution interfaces was observed by researchers [T. Inoue, A. Fujishima and K. Honda, *Chem. Lett.*, 11, 1197 (1978)]. In these metallic ion systems, the metals are deposited on the semiconductor electrode from the solution by a redox mechanism under a proper electrical bias by irradiation at an energy level above the bandgap of the semiconductor. The radiation creates charge carriers in the semiconductor that drive the redox reaction at the interface. When the bias on the electrode is reversed, the redox reaction is reversed and the metal returns to solution. Thus, the semiconductor electrode undergoes a photoelectrochromic effect because the precipitated metal covering the electrode appears as a change in the color of the electrode.

A similar photoelectrochromic effect was observed for a viologen solution semiconductor interface (B. Reichman, Fu-Ren F. Fan, and A. J. Bard, *J. Electrochem. Soc.*, 127, 333 (1980). Using a p-GaAs electrode in a solution of heptyl viologen and bromide ions, the deposition of heptyl viologen bromide on the electrode through a redox reaction driven by photo generated charge carriers caused a color change to appear on the electrode. The author suggested that this photoelectrochromic system might have display applications if a laser raster system could be developed to control and drive the color changes. It was also suggested that electrochromic viologen polymer films formed on a p-type semiconductor electrode could be used in photoelectrochromic displays in a like manner to the viologen solution system [H. D. Abruna and A. J. Bard, *J. Am. Chem. Soc.*, 103, 6398 (1981)]. However, these polymer films degraded quickly and were limited to use on p-type semiconductors. Further, a suitable matrix addressing system has not, so far as is known, been developed.

SUMMARY OF THE INVENTION

Going beyond those technologies, the present invention is directed to a device for creating a photoelectrochromic display with an electrochromic material united to an n-type semiconductor electrode. In accordance with the present invention, an immobilized film of electrochromic solid is formed on a translucent semiconductor electrode. The electrochromic solid is thereby adapted into a light addressable display panel which overcomes the problems of stability, durability and addressing common to the prior art. The user of the present invention may write on the panel using a light pen or other light source. The image made by the user remains on the panel until the user switches the electrical bias of the panel to an opposite state causing the image to erase.

The light addressable display panel of the present invention includes a translucent semiconductor electrode with an electrochromic solid formed in a thin film on one surface of the semiconductor, an electrolyte suitable for interacting with the electrochromic solid, and a counter-electrode in contact with the electrolyte, and a switched biasing circuit to selectively provide biasing voltage between the electrode and counter electrode. Switching between the semiconductor electrode and the counter electrode is provided to selectively bias the semiconductor electrode to a positive, negative or open circuit state relative to the counter-electrode which places the panel in the write, erase or neutral, i.e., hold, mode respectively. The particular arrangement of these components as described herein provide a display panel having superior display characteristics which may be readily adapted to perform a number of display functions.

Further flexibility of the display characteristics is obtained in another embodiment of the present invention which uses a light addressable panel constructed of translucent materials over an electrically addressable electrochromic panel. In this arrangement, the background color for the display panel which overlays the translucent light addressable panel is controlled by the electrically addressable panel and images are formed on the front light addressable panel in response to a light pen or other concentrated light source directed by the user.

DESCRIPTION OF THE PREFERRED EMBODIMENT

Figure 1:
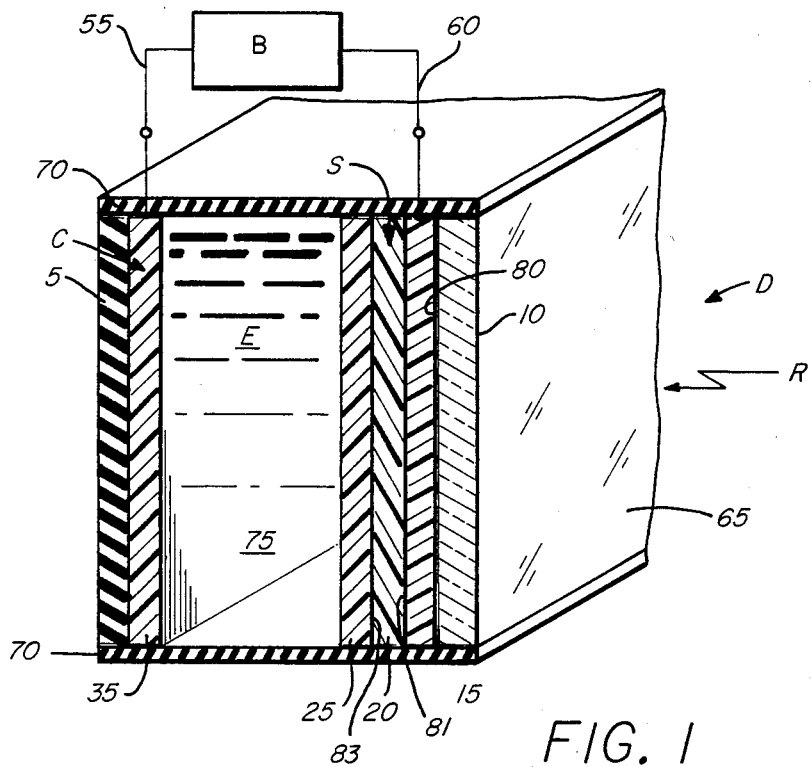
FIG. 1 is a cross-sectional view of a first display according to the present invention, with the thickness of the layers greatly exaggerated and showing the control circuits schematically.

In the drawings, the letter D designates generally a photoelectrochromic display according to the present invention. Display D includes a display face 65 that may be written on using a concentrated light source R, such as a fiber optic laser pen. Images formed by the user on the display D may be stored on the display face 65 or erased in response to a single control switch.

Referring to FIG. 1, display D includes a translucent front panel 10 which defines the display face 65. Translucent panel 10 may be formed of glass, quartz, or synthetic resins. Translucent panel 10 is mounted to enclosure 70. Enclosure 70 includes an insulating back panel 5, and defines an interior cavity 75 between panel 10 and insulating panel 5. Enclosure 70 and the panel 5 may be formed of any suitable chemically inert insulation material, such as glass or synthetic resins, strong enough to provide structural support for the display D.

A semiconductor electrode S, which includes a conductive layer 15 and semiconductive layer 20 formed on the conductive layer 15, is mounted within enclosure 70 spaced below and parallel to panel 10 (FIG. 1). Semiconductive layer 20 may be either n-type or p-type, but in the preferred embodiment, layer 20 is formed of n-type semiconductor materials which provide superior display characteristics and are more easily applied to electrode S. In this configuration, when light at an energy level above the band gap energy of the semiconductive layer 20 emitted from a light source R passes through translucent panel 10 charge carriers are generated in the semiconductor electrode S causing the photoelectrochromic effect described below.

It has been discovered that using a semiconductive layer 20 formed of n-type titanium dioxide provides superior display results. A superior electrode S is formed by coating a titanium or tin oxide conductive layer 15 with titanium dioxide. Preferably, semiconductor electrode S is in the form of a panel that covers the entire display face 65 inside the translucent front panel 10.

In the preferred embodiment of electrode S (FIG. 1), a translucent conductive layer 15 is formed on the posterior surface 80 of translucent front panel 10. Similarly, a translucent semiconductive layer 20 is formed on the posterior surface 81 of conductive layer 15. For example, a glass front panel 10 having a conductive layer 15 formed of a translucent thin film of tin dioxide on its posterior surface 80 has been found to provide excellent display characteristics. Glass having one surface coated with tin dioxide and suitable for this purpose is commercially available through Corning Glass Co. A titanium dioxide semiconductive layer 20 may be formed on the tin dioxide surface of the coated glass by vacuum deposition or other known processes.

Alternatively semiconductor electrode S may be formed on a quartz translucent front panel 10 having a titanium metal conductive layer 15, and a titanium dioxide semiconductive layer 20. In this embodiment titanium is vacuum deposited in a thin film on the inside surface 80 of quartz translucent front panel 10. Thereafter, the titanium coated quartz is heated in pure oxygen to form a titanium dioxide film 20 on the exposed surface of the titanium layer 15. The titanium and titanium dioxide layers thus formed are thin and translucent yet thick enough to provide efficient generation of charge carriers in response to radiation striking semiconductor electrode S.

In the preferred embodiment, a solid electrochromic film 25 is formed on the posterior surface 83 of semiconductive layer 20. A suitable electrochrome for use as a electrochromic film 25 for the titanium dioxide, or other n-type semiconductive layer 20 is ferric ferrocyanide commonly referred in the industry as Prussian Blue. A film of Prussian Blue is deposited on the titanium dioxide semiconductive layer 20 by placing the titanium dioxide semiconductor electrode S in a solution of 0.02 M $FeCl_3$ plus 0.02 M $[Fe(CN)_6]^{3-}$ for two minutes while maintaining a constant cathodic current density across the semiconductive layer 20 of approximately forty (40) microamperes per square centimeter.

An electrolyte E suitable for chemically interacting with the electrochomic film 25 is contained within cavity 75 in contact with electrochromic film 25. For electrodes formed with Prussian Blue electrochromic film, electrolyte E contains potassium ions. An electrolyte E consisting of a 1.0 molar potassium chloride solution in water at pH 4.0 has been found to provide excellent results. The electrolyte E may be partially immobilized by encasing it within a polymer or other porous structure. Only a very thin layer of electrolyte E is necessary to provide the desired electrolytic effect.

A counter-electrode C is also mounted within enclosure 70 and in contact with the electrolyte E. An electric (ionic) current path is thus provided from semiconductor electrode S through electrolyte E to counter-electrode C. The counter-electrode means C, as shown in FIG. 1, may be a thin layer of conductive material, such as tin dioxide, titanium, or platinum, formed on the insulating back panel 5.

A switch B and wire leads 55, 60, provide an external electric current path between counter-electrode C and semiconductor electrode S and provided for selectively biasing the semiconductor electrode S to a positive (anodic) state, a negative (cathodic) state, or to an open current state with respect to the counter-electrode C. By operation of the switch B, the user is able to switch the display device D to a light writing state, an image erasing state, or to an image preserving state.

The light writing state for the preferred n-type semiconductive layer 20 occurs when the semiconductor electrode S is biased in the positive state. When a p-type semiconductive layer 25 is used, the light writing state is the negative bias state. For clarity, only n-type biasing is described herein.

Under positive bias, minority charge carriers, or holes, will be generated in the space charge region of the semiconductor electrode S when light at an energy level above the band gap of the semiconductive layer 20 strikes the semiconductor electrode S. These minority charge carriers flow into the electrochromic film 25 and drive the electrochromic reaction. The generated electric current flows from electrode S through the electrolyte E to the counter-electrode C and switch B to complete a circuit. For a Prussian Blue electrochromic film 25, the light generated charge carriers will change the white reduced form of Prussian Blue to the oxidized (blue) form. In the preferred embodiment, the positive bias voltage is approximately 0.5 volts, but the magnitude of the required bias may vary considerably depending on the electrolyte E used, the thickness of the electrochromic film 25, the speed with which the user wishes the color change to occur, the concentration of dopants in the semiconductive layer 20, and other factors.

In the positive bias or light writing state, for the n-type display D, the electrochromic reaction will not occur in the absence of light generated charge carriers. Thus, the user may control the image formed on the display device D by controlling the location at which light strikes the semiconductor layer 25. For the titanium dioxide system described above, light in the near ultraviolet range is necessary to generate charge carriers. Thus, by using image forming masks with a Xenon lamp or a fiber optic laser pen with an nitrogen pulse laser, the user may write on the display device D to form a desired image.

For a n-type device, the image erase state occurs when the semiconductor electrode S is under negative bias. In the negative bias state, the majority charge carriers or electrons are driven through the electrochromic film 25 and drive the electrochromic reaction in an opposite direction without requiring light. For Prussian Blue, the electrochromic film 25 will be changed from the oxidized (blue) state to the reduced (white) state under negative bias. Any image formed in the light writing state by oxidizing the white form to the blue form of Prussian Blue will be erased. Again, the magnitude of the negative bias should be around 0.5 volts, but can be varied according to the desires of the user. Of course, for a p-type display device D, the image erase state requires a positive bias.

The image preservation state occurs in either n-type or p-type displays D when the switch B is switched to an open circuit state, thus preventing electric current flow through the display D. The electrochromic reaction cannot proceed in either the oxidation or reduction directions unless current can flow. Thus, when the switch B is switched to an open circuit, the image on display D will be preserved for long periods, almost indefinitely subject to any leakage current that may occur if the display D is not properly insulated or sealed.

Figure 2:
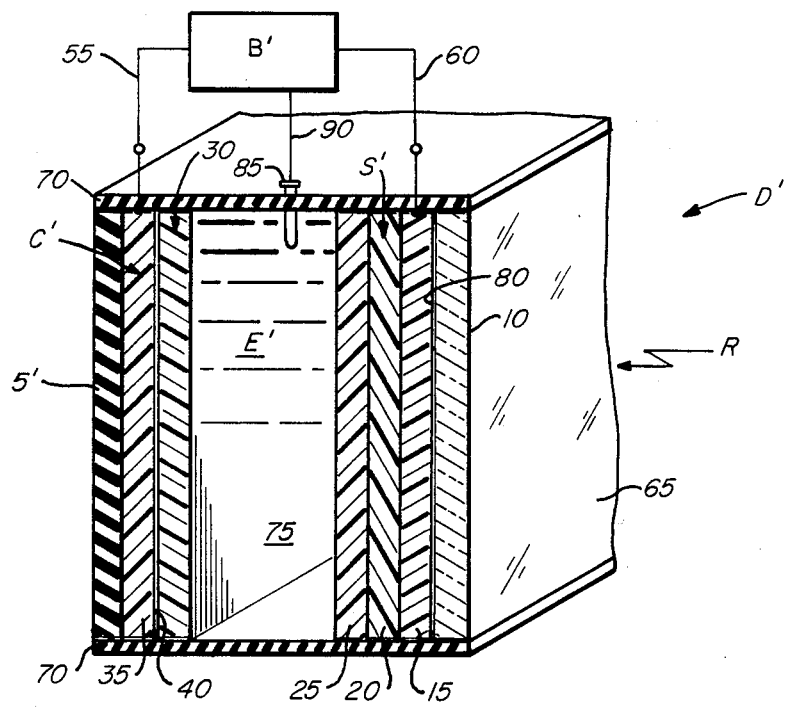
FIG. 2 is a cross-sectional view of an alternate display according to the present invention, again with the thickness of the layers greatly exaggerated.

Another, more versatile embodiment of the present invention is illustrated in FIG. 2 and designated D'. For ease of reference common elements of display D' (FIG. 2) and display device D (FIG. 2) are designated with the same numbers.

Display D' includes a color background panel 30 having an electrochromic layer 40 formed on its anterior surface (that facing user). Since Prussian Blue in a thin film is translucent in the reduced white form, when Prussian Blue electrochromic film 25 is in the white reduced form, and semiconductor electrode S is translucent the user can discern objects, such as background color panel 30 behind the electrochromic film 25. Electrochromic layer 40 on panel 30 enables the user to control the color of the background panel 30. Background panel 30 may be constructed of a conductive panel 35, such as tin dioxide on glass, with an electrochromic layer 40 formed on the anterior surface of conductive panel 35 facing the translucent front panel 10. An auxiliary electrode 85 is placed in contact with the electrolyte E' in order to provide independent control of the background panel 30 from the semiconductor electrode S'. Switch B' is connected to auxiliary electrode 85 through wire 90, and controls the bias of the background panel 30 with respect to the auxiliary electrode 85 in a like manner as described for the semiconductor electrode S' above. As is appreciated in the art, the current flow across the background panel will drive the electrochromic reaction in the absence of light in either direction depending on the direction of current flow.

A plurality of the displays D of FIG. 1 or the displays D' of FIG. 2 reduced in size may be used in conjunction arranged in a matrix (not shown) in order to provide improved control of the image formation. When arranged in a matrix, each separate display device D may be independently controlled via a switch B. Further, electronic or computer controlled switching systems (not shown) may be employed to coordinate the operation of a large number of displays D arranged in a matrix.

Figure 3:
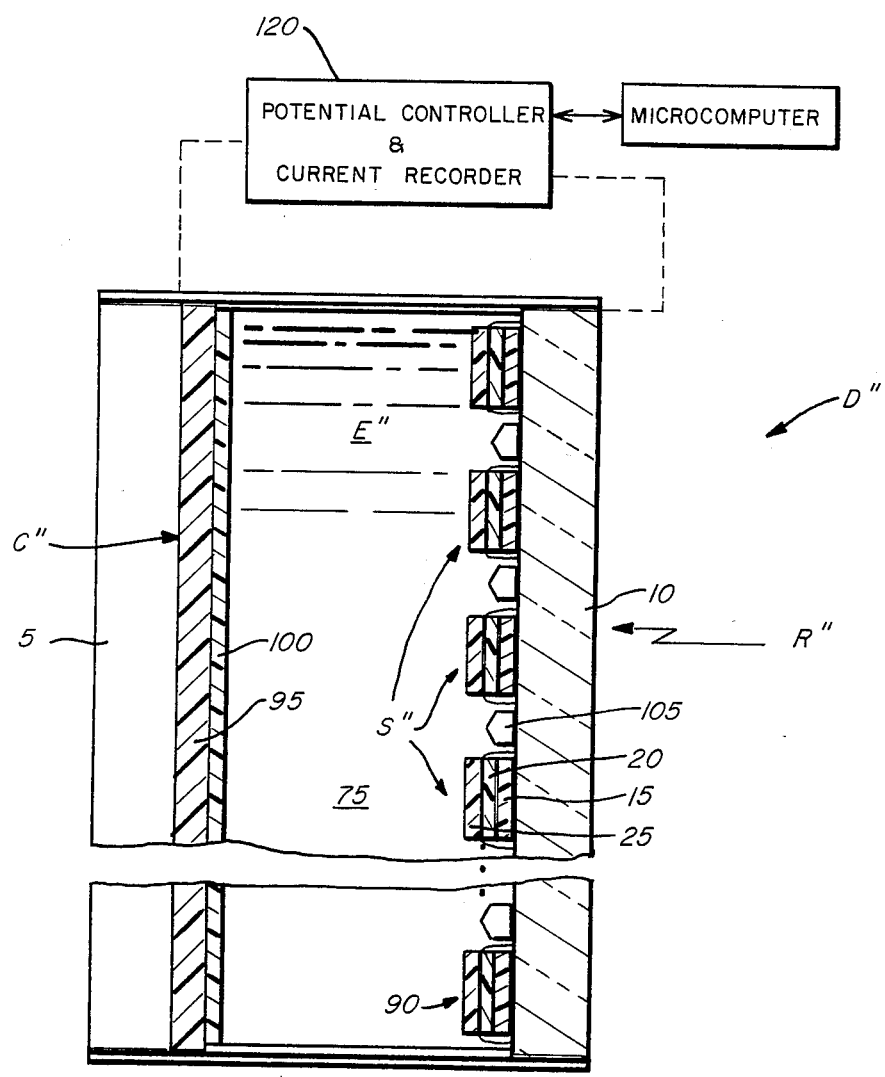
FIG. 3 is a cross-sectional view of yet another alternate display device according to the present invention, showing the arrangement of the electrodes in columns and rows, again with the thickness of the layers greatly exaggerated.
Figure 4:
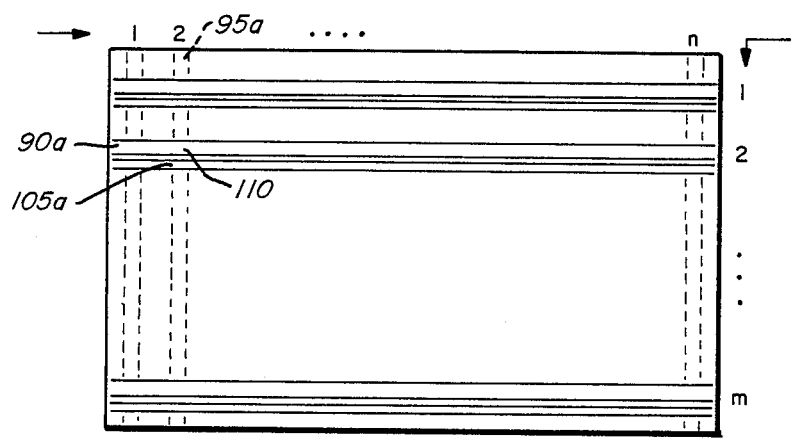
FIG. 4 is a schematic drawing showing the configuration of the matrix address system with the strips on the front panel shown in solid lines and the strips on the back panel shown in dashed lines.

Referring now to FIG. 3, another embodiment of the display D is illustrated and designated D''. In this embodiment, a plurality of semiconductor electrodes S'' are provided on translucent front panel 10 in the form of a plurality of spaced parallel semiconductor electrode strips 90 (FIG. 4). Each of the semiconductor electrode strips 90 is formed generally in the same manner and with similar materials as semiconductor S described above. Semiconductor electrodes S'' can be easily manufactured in strips 90 using masking techniques known in the art. Each of the semiconductor electrode strips 90 is electrically independent of the others. Elements in FIG. 3 that are common to FIGS. 1 and 2 are designated with the same number as in FIG. 1 and 2.

Referring now to FIG. 3, counter-electrode C'' is mounted adjacent to insulating back panel 5 and includes a plurality of spaced parallel conductor strips 95 extending transversely with respect to the semiconductor electrode strips 90 (see FIG. 4). Each of conductor strips 95 is electrically independent of the others. Further, each conductor strip is coated with a thin electrochromic layer 100.

For the desired flexibility of operation, spaced parallel auxiliary electrode strips 105 of conductive material are formed between the semiconductor electrode strips 90 on the translucent front panel. Again, each auxiliary electrode strip 105 is electrically independent of the others.

Display D'' (FIG. 3) is constructed such that the electrolyte E'' is contained in a very thin cavity 75. The thickness of which has been greatly exaggerated in the drawings for clarity. Control 120 operates each semiconductor electrode strip 90, each conductor strip 95 and each auxiliary electrode strip 105 independently for electrically biasing each of them positively, negatively, or to an open circuit with respect to any one of them, thus forming a matrix-type address system.

Referring now to FIG. 4, the application of voltages to a semiconductor electrode 90 and a particular transverse conductive strip 95a will cause activation of the segment of the semiconductor electrode 90a at the point 110 where the transverse conductive strip 95a crosses close to the semiconductor electrode 90a (FIG. 4). Likewise, the electrochromic layer 100 on the conductive strip 95 will be activated by applying appropriate bias with respect to a particular auxiliary electrode 105a in the area near the point (not shown) where the conductive strip 95 and the electrode 105a cross.

Control 120 includes a current recorder (not separately) which detects the amount of charge flow through display D'' with respect to each conductor strip 95 of the counter-electrode C'' and each auxiliary electrode 105. Because the reduction reaction which erases images on the display D'' creates current flow proportional to the amount of electrochrome reduced, the user is able to record the current at each cross point 110 (FIG. 4) proportional to the extent of electrochromic reaction at each cross point 110 and store the data received in a computer. In this manner, the image formed on the display face 65 can be recalled.

The current generated during the activation of a given semiconductor electrode S" will indicate the amount of electrochromic reaction occuring near the cross point 110 of the conductive strip 95 with the activated semiconductor electrode S". By sequentially activating each of the semiconductor electrode S" in the image erase state while only one conductive strip 95 of the counter-electrode C" is activated, then repeating the process for each conductive strip 95, control 120 records the reaction occuring at each cross point 110. Thus, the image erased from the display face 65 of display D" can be stored in memory.

Display D of the present invention provides a flat panel that the user may write on with a light pen or other light source and erase repeatedly which has useful application to educational instruction or as in a visual aid in presentations. A variable color background may be provided and display D may be made interactive with a microcompútere for example to provide recall of erased images and programmable image forming as well as light writing. It should be appreciated that the electrochromic materials used can be of a variety of colors and forms. Further, the semiconductor electrodes may be manufactured with a wide range of band gap energies allowing for use of a variety of light sources for writing purposes.

The foregoing disclosure and description of the invention are illustrative and explanatory thereof, and various changes in the size, shape and materials, as well as in the details of the illustrated construction may be made without departing from the spirit of the invention.

We claim:

1. A light addressable photoelectrochromic display apparatus, comprising:
   a semiconductor electrode comprising a translucent conductor having a translucent semiconductive substrate formed thereon, said electrode semiconductor generating charge carriers in response to light energy absorbed by said semiconductor; and
   an electrochromic substrate formed on said semiconductive substrate, said electrochromic substrate exhibiting a solid phase electrochemical redox reaction color change in response to said charge carriers, so that an image is formed on said display apparatus by a light activated color change in said electrochromic substrate.

2. The apparatus of claim 1, further comprising:
   an electrolyte in association with said electrochromic substrate, said electrolyte being suitable for interacting with said electrochromic substrate to establish an ion current between said electrolyte and said electrochromic substrate.

3. The apparatus of claim 2, wherein said electrolyte comprises a 1.0 molar solution of potassium chloride having a pH of about 4.0.

4. The apparatus of claim 2, further comprising:
   a conductive counter-electrode in electrical association with said electrolyte for transmitting electrial current to and from said electrolyte.

5. The apparatus of claim 4, further comprising:
   biasing means for selectively providing biasing voltage to said semiconductor electrode.

6. The apparatus of claim 5, wherein said biasing means comprises switch means for selectively completing an electrical circuit between said conductor and said counter electrode through said semiconductive substrate, said electrochromic substrate, and said electrolyte to apply positive, negative or neutral voltage across said semiconductor electrode to place said electrode in a light writing state, an erasing state or an open circuit state respectively.

7. The apparatus of claim 1, wherein said semiconductor substrate is formed of n-type semiconductor material.

8. The apparatus of claim 7, wherein said semiconductor substrate is formed of titanium dioxide.

9. The apparatus of claim 8, wherein said conductor is formed of titanium.

10. The apparatus of claim 8, wherein said conductor is formed of tin dioxide.

11. The apparatus of claim 1 wherein said electrochromic substrate is formed of ferric ferro cyanide.

12. The apparatus of claim 1, further comprising:
    a translucent user panel overlaying said conductor of said semiconductor electrode.

13. The apparatus of claim 12 wherein said panel is formed of glass.

14. The apparatus of claim 12 wherein said panel is formed of quartz.

15. The apparatus of claim 12, wherein said semiconductor electrode is formed as a substrate upon said user panel.

16. The apparatus of claim 1, further comprising:
    a light source for providing light having an energy greater than the band gap energy of said semiconductive substrate whereby light from said source may be directed through said conductor into said semiconductor substrate to generate charge carriers in said semiconductor substrate.

17. The apparatus of claim 16, wherein said light source comprises a fiber optic laser pen in association with a nitrogen pulse laser.

18. The apparatus of claim 16, wherein said light source comprises a xenon lamp.

19. The apparatus of claim 3, wherein said electrolyte is translucent and said apparatus further comprises:
    a color background means interposed between said electrolyte and said counter-electrode for providing a color background for said display apparatus.

20. The apparatus of claim 19 wherein said color background means comprises
    an electrochromic film; and
    means for providing background biasing voltage from said eletrolyte to said counter-electrode whereby the color of said background is effected due to the electrochromic reaction on said electrochromic film in association with said electrolyte in response to changes in the biasing voltage.

21. The apparatus of claim 20, wherein said background biasing means comprises an auxiliary electrode mounted in said electrolyte; and
    switching means for selectively completing an electrical circuit between said auxiliary electrode and said counter-electrode through said electroylte.

22. A light addressable photoelectrochromic display apparatus comprising:
    a plurality of individually light addressable semiconductor electrodes, each of said electrodes comprising:

a translucent conductor having a translucent semiconductive substrate formed thereon, said semiconductive subtrates generating charge carriers in response to light energy absorbed by said semiconductor; and an electrochromic substrate exhibiting a solid phase electrochemical redox reaction color change in response to said charge carriers from said semiconductive substrate, so that an image is formed on said display apparatus by a light activated color change in said electrochromic substrate.

23. The apparatus of claim 22, further comprising:
an electrolyte in electrical association with said electrochromic substrates.

24. The apparatus of claim 23, further comprising:
a plurality of conductive counter-electrodes in association with said electrolyte for transmitting current to and from said electrolyte.

25. The apparatus of claim 24, wherein said semiconductor electrodes comprise a plurality of spaced parallel strips mounted to a translucent user front panel.

26. The apparatus of claim 25, further comprising:
a plurality of spaced parallel conductive counter-electrode strips, mounted in association with said electrolyte opposing said semiconductor strips.

27. The apparatus of claim 26 wherein said counter-electrodes are mounted having their longitudinal axis transverse to the longitudinal axis of said semiconductor electrode strips.

28. The apparatus of claim 25, further comprising:
a plurality of auxiliary conductive electrode strips formed on said front panel between said semiconductor electrode strips;

an electrochromic substrate formed on said counter-electrodes;

biasing means for providing biasing voltage between said auxiliary electrodes and said counter-electrodes.

29. The apparatus of claim 22, further comprising:
biasing means for selectively providing biasing voltage to said semiconductor electrodes.

30. The apparatus of claim 29, wherein said biasing means comprises:
switching means for selectively completing an electrical circuit between one or more of said conductors and one or more said counter electrodes through said semiconductive substrate, said electrochromic substrates and said electrolyte to apply positive, negative or neutral voltage across one or more of said electrodes to place said electrodes in a light writing state, an erasing state or an open circuit state respectively.

31. The apparatus of claim 30, wherein said switching means includes a programmable machine having memory means for storing switch control sequences and means for forming switch control signals to control said switching means and wherein said switching means provides biasing voltage to selected electrodes in responses to control signals from said programmable machine.

* * * * *